US012654960B2

(12) United States Patent     (10) Patent No.:   US 12,654,960 B2

Štefanič     (45) Date of Patent:     Jun. 16, 2026

(54) FLOATING BEARED CONE OF TABLET AND POWDER DOCKING STATION

(71) Applicant: Brinox D.O.O., Medvode (SI)

(72) Inventor: Edvard Štefanič, Dragatus (SI)

(73) Assignee: Brinox D.O.O., Medvode (SI)

( * ) Notice: Subject to any disclaimer, the term of this patent is extended or adjusted under 35 U.S.C. 154(b) by 105 days.

(21) Appl. No.: 18/843,434

(22) PCT Filed: May 10, 2022

(86) PCT No.: PCT/SI2022/050015

§ 371 (c)(1),
(2) Date: Sep. 3, 2024

(87) PCT Pub. No.: WO2023/167640

PCT Pub. Date: Sep. 7, 2023

(65) Prior Publication Data

US 2025/0178849 A1     Jun. 5, 2025

(30) Foreign Application Priority Data

Mar. 3, 2022    (SI) ................................. P-202200028

(51) Int. Cl.
*B65G 65/40*       (2006.01)

(52) U.S. Cl.
CPC .................................... *B65G 65/40* (2013.01)

(58) Field of Classification Search
CPC ....... B65G 65/40; B65G 69/183; B65D 90/62
See application file for complete search history.

(56) References Cited

U.S. PATENT DOCUMENTS

| | | | | |
|---|---|---|---|---|
| 4,470,524 A | * | 9/1984 | Semenenko | ........... B65G 65/44 |
| | | | | 92/39 |
| 5,036,894 A | * | 8/1991 | Semenenko | ......... B65D 90/626 |
| | | | | 251/363 |
| 5,582,332 A | * | 12/1996 | Kiefer | .................. B65G 69/183 |
| | | | | 222/509 |

(Continued)

FOREIGN PATENT DOCUMENTS

| | | | | |
|---|---|---|---|---|
| DE | 10010995 A1 | * | 8/2001 | ........... B65G 69/183 |
| EP | 915032 A1 | * | 2/1996 | ............. B65D 90/66 |

(Continued)

OTHER PUBLICATIONS

International Search Report, Sep. 7, 2023, PCT/SI2022/050015.
Written Opinion, Sep. 7, 2023, PCT/SI2022/050015.

*Primary Examiner* — Michael A Riegelman
(74) *Attorney, Agent, or Firm* — Sand, Sebolt & Wernow Co., LPA

(57) ABSTRACT

A floating beared coned of tablet or power docking station. The cone includes a base and a cap. The cone further includes locks for locking a cone valve of a container and silicone member and is horizontally beared via at least one bearing and a carrier elements of the at least one bearing which is fixed to a cylinder of the cone and placed between and upper carrier plate and a lower carrier plate. The cone is centered via at least one spring pin and eccentrically locked via at least one eccentricity lock and enables eccentrical adaptation and adjustment in all horizontal direction up to 12 mm and opening and closing of the cone valve of the container eliminates hygienical rubber over the entire surface of the cone.

1 Claim, 2 Drawing Sheets

A-A

(56) References Cited

U.S. PATENT DOCUMENTS

Figure 1:
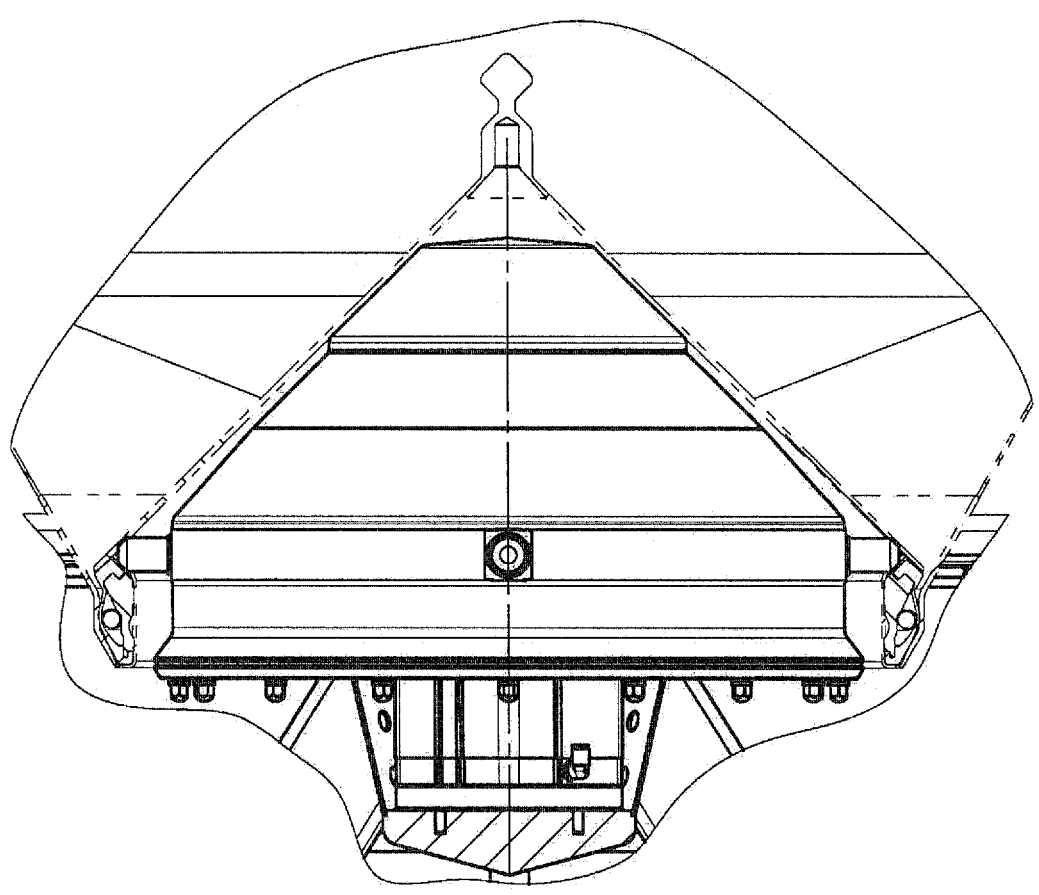
Figures 2, 3:
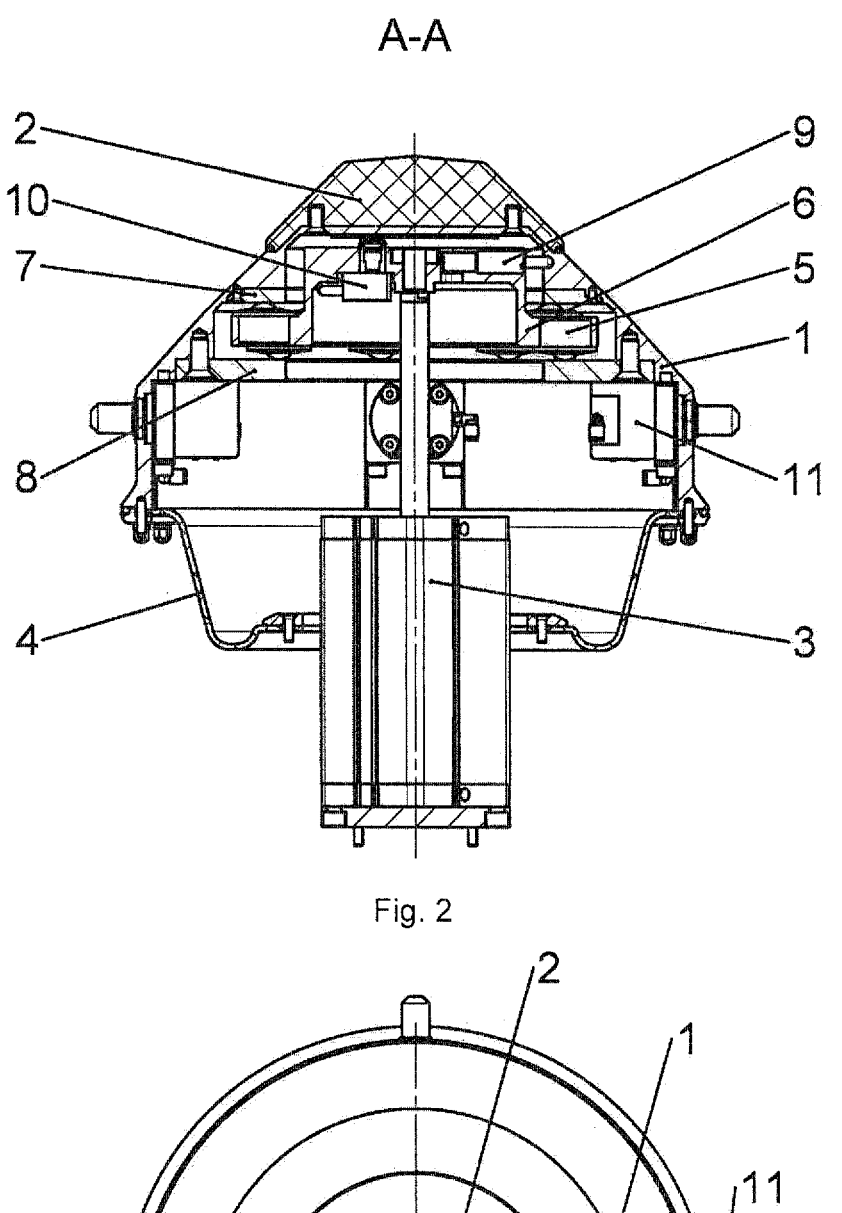

| | | | | | |
|---|---|---|---|---|---|
| 5,651,472 | A | * | 7/1997 | Semenenko | B65D 90/626 |
| | | | | | 292/13 |
| 5,743,439 | A | * | 4/1998 | Semenenko | B65G 69/183 |
| | | | | | 141/369 |
| 5,893,567 | A | * | 4/1999 | Bitterli | B65G 69/183 |
| | | | | | 414/292 |
| 6,199,606 | B1 | * | 3/2001 | Semenenko | B65G 69/183 |
| | | | | | 141/351 |
| 6,296,152 | B1 | * | 10/2001 | Semenenko | B65G 69/181 |
| | | | | | 222/507 |
| 6,305,443 | B1 | * | 10/2001 | Semenenko | B65G 69/183 |
| | | | | | 141/346 |
| 2003/0075572 | A1 | * | 4/2003 | Semenenko | B65G 69/183 |
| | | | | | 222/559 |
| 2003/0155359 | A1 | * | 8/2003 | Piepereit | B65G 69/183 |
| | | | | | 220/203.01 |
| 2009/0260715 | A1 | * | 10/2009 | Bauer | B65G 69/183 |
| | | | | | 141/312 |
| 2012/0096819 | A1 | * | 4/2012 | Piepereit | B65G 69/183 |
| | | | | | 53/510 |
| 2025/0178849 | A1 | * | 6/2025 | Štefanic | B65G 65/40 |

FOREIGN PATENT DOCUMENTS

| | | | | | | |
|---|---|---|---|---|---|---|
| EP | 0801015 | B1 | * | 11/1999 | | B65G 69/183 |
| EP | 1041013 | A2 | * | 10/2000 | | B65G 69/183 |
| EP | 1348644 | A1 | * | 10/2003 | | B65D 90/626 |
| EP | 1468917 | A1 | * | 10/2004 | | B65G 69/183 |
| ES | 2138467 | T3 | * | 1/2000 | | F15B 15/10 |
| JP | H05162788 | A | | 6/1993 | | |
| JP | 2017519690 | A | * | 7/2017 | | B65B 69/00 |
| WO | WO-9422746 | A1 | * | 10/1994 | | B65D 90/62 |

* cited by examiner

A-A

FLOATING BEARED CONE OF TABLET AND POWDER DOCKING STATION

Subject of the invention is floating beared cone of tablet and powder docking station, which is used on tablet and powder docking stations in the field of material handling in process industry. In vertical transport, containers in which powders, tablets or granules are transported, are docked to a docking station prior to material handling of their content. After docking of the container on a docking station, cone valve of the container, which is mounted on bottom outlet of the container, has to be opened through elevation of the cone and intermediate locking of the cone on the cone valve of the container. During this operation eccentricity occurs originating from inaccuracies of the components, docking tolerances of the station and slips when locking of the cone valve through rubber tubes resulting in inappropriate closing of the cone valve on containers. As a consequence of inappropriately closed container the following malfunctions occur: scattering of the material, intrusion of the external atmosphere into the interior of the container, inappropriate inertization of the container and similar.

The cones of the previous design are fully covered with hygienic rubber which protects technical interior of the cone against exterior with product contact. This hygienic rubber is very problematic in terms of washing and drying and also manufacturing quality. This kind of cones are fixedly fastened and do not allow adaptation of the eccentricity of the bottom outlet of the container. The cone locks on the cone valve through inflatable rubber tube which means that this locking is not fixed and in case of eccentrical docking on the bottom outlet of the container this results in uneven closing of the cone valve. Consequently the cone valve is closed inappropriately. This problematic is the same both in tablet and in powder containers.

Floating beared cone of tablet and powder docking station according to the invention solves described problems. New generation of floating beared cone according to the invention enables removing of the hygienic rubber, which covered entire cone of the previous generation, enables adaptation and adjustment of the eccentricity between cone of the docking station and cone valve of the container and enables fixed locking and leveling of the cone valve of the container during opening and closing of the cone valve resulting in appropriate closure of the cone valve and thus container.

The invention will be explained in detail on the basis of implementation example and accompanying pictures from which it shows:

Picture 1 floating beared cone according to the invention, mounted on a docking station;

Picture 2 floating beared cone according to the invention in cross-section and side view;

Picture 3 floating beared cone according to the invention in plan view.

Picture 1 shows the floating beared cone according to the invention, mounted on docking station. The cone valve of the container is locked on the cone. The locking point of the cone and the cone valve is also marked.

The cone according to the invention consists of an eccentrically locked base 1 with cap 2, which is floating beared on bearings 5 and carrier element 6 of the bearings 5, which are fixed on cylinder 3 of the cone and placed between the upper carrier plate 7 and lower carrier plate 8 of the cone. The base of the cone 1 is centrally centered through the spring elements 9 and eccentrically locked through the eccentricity locks 10. The locking of the cone is performed with pneumatic locks 11 for locking of the cone valve of the container.

Picture 2 shows the cone according to the invention in cross-section and side view. Central part of the cone is base 1 which leans on the cone valve with its cap 2, during the opening of the cone valve of the container. Lifting and lowering of the cone is performed with pneumatic cylinder 3. Technical interior of the cone is protected against the exterior product side of the device with silicone membrane 4, which is mounted only on the lower part of the cone base 1.

When the container docks on the docking station cone elevates to the cone valve of the container. During this elevation cone with its cap 2 eccentrically adjusts to the cone valve of the container. This is done at lower pressure, which enables the cone to merely approach and adjust to the conical valve of the container.

Floating bearing of the cone enables adjustment and elimination of the horizontal eccentricity between the center of the cone of the docking station and the center of the cone valve and also the center of the bottom outlet of the container on which the cone valve of the container is mounted and thus the container is closed. Floating bearing is made via bearings 5, which are inserted into the carrier element 6 of the bearings 5, all of which is fixed to the pneumatic cylinder 3. Bearings 5 are placed between two plates, namely upper carrier plate 7 and lower carrier plate 8, which are fixed to the cone base 1. In this way through floating bearing the cone base 1 can move in all directions horizontally for at least 12 mm. For this value such a cone is consequently capable of adjustment and elimination of eccentricity.

After elevation with lower pressure, when the base 1 via the floating bearing described above adjusts to the eccentric conical valve, the cone is locked to the cone valve of the container. This is conducted with pneumatic locks 11, the axes of which are pushed into the extended position. Pneumatic locks 11 are four and are spaced 90° apart around the circumference of the cone base 1. The axes of the locks 11 when in extended position are caught in the inner edge of the cone valve of the container thereby locking and also leveling the cone valve. At the same time as locking the cone to the cone valve the eccentric position of the cone is locked with eccentricity locks 10. Two eccentricity locks 10 ensure that the eccentric position of the cone does not change from the point of locking to the cone valve to the point of unlocking of cone valve. This is important because the cone consequently no longer needs its guidance during the elevation to the final upper position and returning back of the cone to the bottom outlet of the container as it is fixed in eccentrical position. After locking of the cone to the cone valve and consequently leveling of the cone valve, the cone together with cone valve is elevated to the final upper position with high pressure via pneumatic cylinder 3.

In this way the bottom outlet of the container is opened and ready for gravimetric transfer of powders or tablets and granules, or for the process of inertization of the container or for any other operation for which the docking station is intended.

For operating of the cone it is important that after unlocking the cone valve and lowering of the cone to the initial lower position, the cone returns to the initial central position, which is enabled by spring elements 9, five of which are located around the circumference of the carrier element 6 of the bearings 5. In this way the cone in its initial lower position on the docking station is always centered in central position, which in turn allows the cone to cover and adjust the intended eccentricity in all directions when docking to a new container.

A vibrator can be placed on the considered cone to prevent stagnation of the material when handling powders and granules.

The invention claimed is:

1. A floating beared cone of tablet or a powder docking station, comprising:

at least one lock on a cone for locking a cone valve of a container;

at least one silicone membrane through at least one spring pins centrally centered and through at least one eccentricity lock;

an eccentrically locked base with a cap; and a floating beared via at least one bearing and a carrier element of the at least one bearing, which are fixed to the cylinder of the cone and placed between an upper carrier plate and a lower carrier plate.

\* \* \* \* \*